United States Patent [19]
Fujita et al.

[11] Patent Number: 4,808,895
[45] Date of Patent: Feb. 28, 1989

[54] ACCELERATION CONTROL APPARATUS

[75] Inventors: Jun Fujita; Yoshinori Nakanishi; Etsuzi Oda; Kazutaka Yamashita, all of Numazu, Japan

[73] Assignee: Toshiba Machine Co., Ltd., Tokyo, Japan

[21] Appl. No.: 126,926

[22] Filed: Nov. 30, 1987

[51] Int. Cl.$^4$ .............................................. H02P 1/00
[52] U.S. Cl. ..................................... 318/384; 318/276
[58] Field of Search ............... 318/255, 268, 276, 301, 318/311, 342, 384, 385, 397, 404, 271

[56] References Cited

U.S. PATENT DOCUMENTS

| | | | |
|---|---|---|---|
| 3,921,818 | 11/1975 | Yamagishi | 318/384 X |
| 4,075,538 | 2/1978 | Plunkett | 318/52 |
| 4,099,108 | 7/1978 | Okawa et al. | 318/808 |
| 4,300,079 | 11/1981 | Kawada et al. | 318/271 X |

FOREIGN PATENT DOCUMENTS

| | | | |
|---|---|---|---|
| 55-52111 | 4/1980 | Japan | 318/384 |
| 57-130120 | 8/1982 | Japan | 318/271 |

*Primary Examiner*—Bentsu Ro
*Attorney, Agent, or Firm*—Cushman, Darby & Cushman

[57] ABSTRACT

This invention provides an acceleration control apparatus suitable for use as various kinds of feed control. A comparator circuit compares a command value supplied from an acceleration commanding unit and an actual value of acceleration detected by a signal generator connected to a motor to be controlled. A voltage command computing circuit provided at a rear stage of the comparator circuit effect predetermined processing of an acceleration deviation signal on the basis of the result of this comparison to output the resultant command voltage to a driving control circuit. This command voltage is output to the motor and thus acceleration of the motor is controlled.

8 Claims, 8 Drawing Sheets

ACCELERATION CONTROL APPARATUS

BACKGROUND OF THE INVENTION

1. Field of the Invention

The present invention relates to an acceleration control apparatus and, more particularly, to an acceleration control apparatus for controlling acceleration by directly comparing an acceleration command value and an actual value of acceleration.

2. Description of the Prior Art

In the field of tool feed control of machine tools, acceleration control has been performed in order to reduce its mechanical impact and to enable high-precision positioning.

A conventional type of acceleration control apparatus for performing such acceleration control is arranged as shown in FIG. 8. In FIG. 8, the illustrated acceleration control apparatus includes the acceleration commanding unit 10, a current command computing circuit 2 for calculating a current command value on the basis of the output signal of the acceleration commanding unit 10 and that of the position detector 61 directly connected to the motor 50, a driving control circuit 40 which forms a current minor loop, and a motor 50 to be controlled. The current command computing circuit 2 converts an acceleration command value $\alpha c$ into a current command equivalent signal of an amplitude proportional to the acceleration command value $\alpha c$ output from the acceleration commanding unit 10 (in FIG. 8, $K\alpha I$ represents the acceleration/current amplitude conversion constant). Accordingly, the acceleration of the motor 50 is controlled on the basis of the acceleration command value $\alpha c$ and a position signal (angle of rotation) $\theta$ of the rotor of the motor 50. In other words, such a conventional acceleration control apparatus is not designed to directly form an acceleration loop for controlling the acceleration of the motor. Therefore the acceleration command value $\alpha c$ is converted into a corresponding current command, and a current minor loop provided in the driving control circuit 40 is substituted for the acceleration loop. This primarily derives from a historical background.

The aforesaid conventional acceleration control apparatus, however, involves the following problems.

In general, the substitute current minor loop is incorporated into a speed control loop. Therefore, in any of the cases where a load varies owing to friction, where the correlation between an assumed current amplitude and the torque generated by the motor 50 (a so-called torque constant) differs from an actual torque constant, and where the inertia of a load connected to the motor 50 differs from an actual inertia, it is impossible to exert accurate control based on the acceleration command value $\alpha c$, and this causes a significant error between the assumed and actual acceleration. When such an error occurs, the error of a gain (cutoff frequency) of the aforesaid speed loop results. In addition, in a case where the gain of the speed loop is reduced owing to the error, an overshoot or vibration may result. Accordingly, it is pointed out that the current minor loop is not suitable for use with precise machine tools.

Secondly, since the substitute current minor loop is typically constituted by an analog circuit, an offset and a drift are likely to occur, and this may induce variations in the torque of the motor 50. For instance, in a case where the current minor loop is applied to the control of the tool feed shaft of a machine tool, a fringe pattern may be formed on a worked surface since it is impossible to fix its feed speed.

This problem is significantly important in terms of the installation environment of machine tools or various other circumstances which surround users.

To overcome such a problem, it is considered that the current minor loop is constructed by digital processing means. However, a high-speed and high-precision A/D converter is needed in order that the entire control system may be constructed as shown in FIG. 8 while the current command value and the feedback current value are digitized. However, this idea is not practical for economic reasons. In addition, since an offset and a drift are involved in such an A/D converter, this is not an essential countermeasure. Moreover, arithmetic operations upon the current minor loop gain must be performed by a CPU which stores software therein, with the result that an enormous throughput is needed because the motor 50, for example, a three-phase a.c. motor requires compensation elements for each of the three phases. Accordingly, the duration of a sampling time must be enlengthened or a high-speed CPU must be used. However, in the former case, current response deteriorates and controllability is thus lowered since the current loop gain lowers. The latter proposal is difficult to carry out for economical reasons similar to those mentioned above in connection with the A/D converter.

SUMMARY OF THE INVENTION

It is therefore a primary object of the present invention to provide an acceleration control apparatus capable of achieving accurate acceleration control without being affected by disturbance such as load variations and the non-uniformity of the torque characteristics of a motor torque as well as without involving an overshoot or vibration.

The present invention contemplates elimination of the aforesaid conventional problems by forming an acceleration control loop by means of direct feedback of an actual value of acceleration, on the basis of the recognitions that the problems derive from the substitute current minor loop serving as the control system and that the aforesaid conventional problems cannot be solved by a partial improvement such as incorporation of digital processing because of the essential characteristics of a control system.

The above object is achieved by the prevent invention which provides an acceleration control apparatus comprising:

an acceleration commanding unit;
a signal generator connected to a motor for generating a signal indicative of information representing rotation of the motor;

a comparator circuit for creating an acceleration deviation by comparing an acceleration command value supplied from the acceleration commanding unit and an actual acceleration supplied from the signal generator;

a voltage command computing circuit for calculating a voltage command value on the basis of said acceleration deviation signal output from the comparator circuit; and a driving control circuit for generating electrical signals suitable for driving and controlling the motor on the basis of an output signal of the voltage command computing circuit, whereby acceleration is controlled on the basis of the comparison of the acceleration command value and the actual acceleration.

Therefore, the comparator circuit compares the acceleration command value supplied from the acceleration commanding unit and the actual value of acceleration which the signal generator detects generates from the result of detection as to the motor to be controlled. On the basis of the resultant acceleration deviation, the acceleration of the motor can be controlled through the voltage commanding computing circuit and the driving control circuit.

DETAILED DESCRIPTION OF THE PREFERRED EMBODIMENTS

Figure 8:
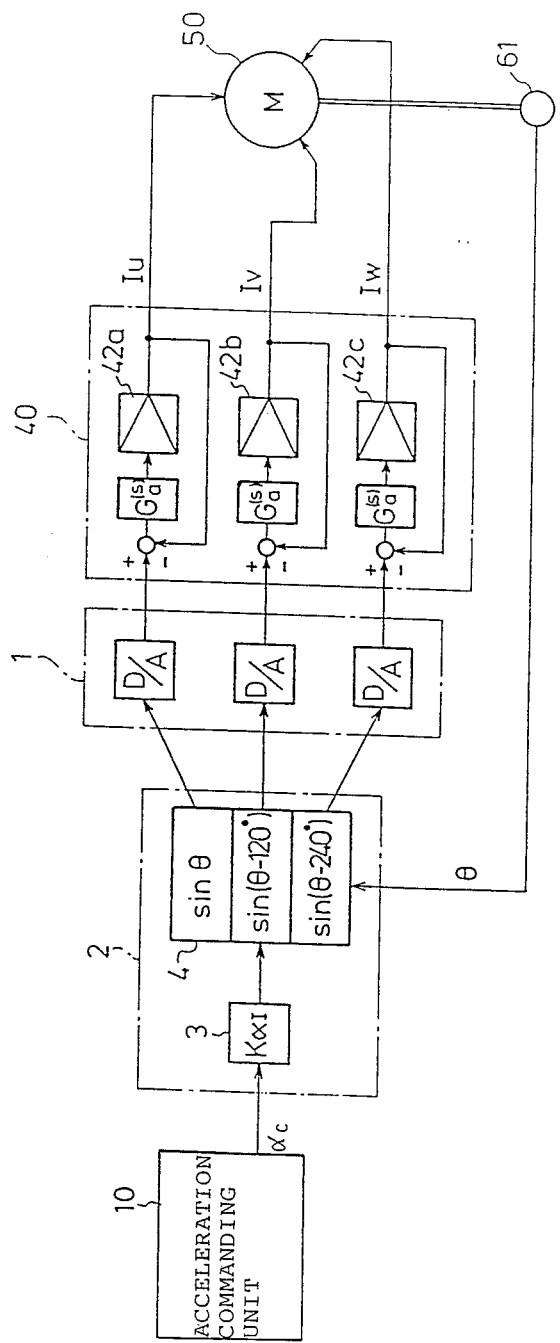
FIG. 8 is a detail block diagram illustrating a prior art acceleration control apparatus.

Preferred embodiments of an acceleration control apparatus in accordance with the present invention will be described in detail below with reference to the accompanying drawings. In the following description, like reference numerals are used to denote like or corresponding components relative to those of the previously-described prior art acceleration control apparatus shown in FIG. 8.

(FIRST EMBODIMENT)

Figure 1:
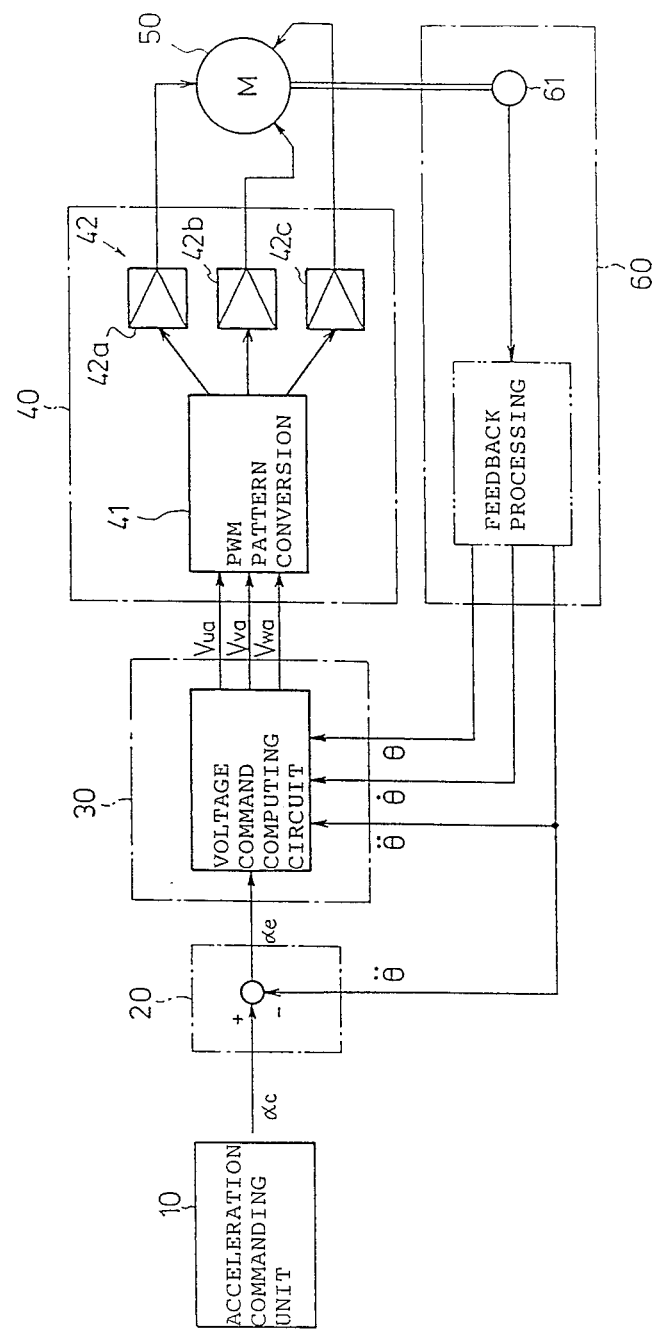
FIG. 1 is a block diagram illustrating a first preferred embodiment of an acceleration control apparatus in accordance with the present invention (a three-phase a.c. motor is used in this embodiment by way of example)
Figure 2:
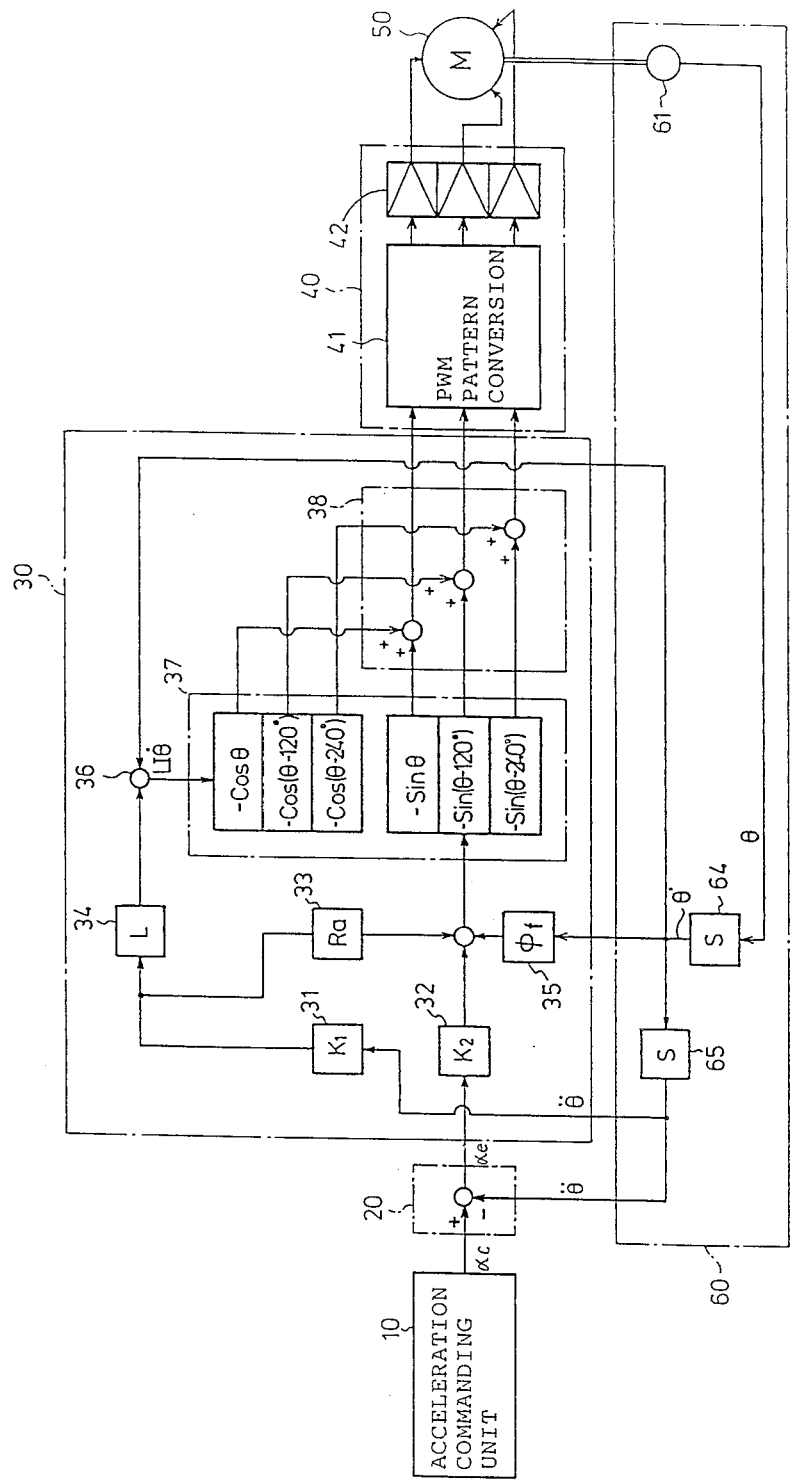
FIG. 2 is a detail block diagram illustrating the first embodiment shown in FIG. 1.

FIG. 1 and 2 show a first preferred embodiment of the invention which is designed to control a three-phase, non-salient-pole, permanent-magnetic-field type of synchronous motor and which includes a signal generator constituted by a position detector.

The first preferred embodiment of the acceleration controlling apparatus includes the acceleration commanding unit 10, a comparator circuit 20, a voltage command computing circuit 30, the driving control circuit 40, the motor 50, and a signal generator 60. These components constitute in combination a digital servo.

The acceleration commanding unit 10 outputs once in each sampling time an acceleration commanding value $\alpha c$ which is a digital signal representative of the next target acceleration.

The signal generator 60 is constituted by a position detector 61 connected directly to the three-phase, non-salient-pole, permanent-magnetic-field type of synchronous motor 50 which is to be controlled, as well as differentiating circuits 64, 65 which effects feedback processing of a position signal $\theta$ output from the position detector 61. The position detector 61, which is constituted by a pulse encoder, outputs the position signal $\theta$ corresponding to the position (angle of rotation) of the rotor of the motor 50. The differentiating circuit 64 creates a speed signal $\dot\theta$ by differentiating the position signal $\theta$ once. The differentiating circuit 65 creates an acceleration signal $\ddot\theta$ by differentiating the speed signal $\dot\theta$ once. The thus-obtained signal $\ddot\theta$ represents the actual value of the acceleration.

The comparator circuit 20 compares the acceleration command value $\alpha c$ supplied from the acceleration commanding unit 10 with the acceleration signal $\ddot\theta$ which is the actual acceleration supplied from the signal generator 60, and output an acceleration deviation signal $\alpha e$. The comparator circuit 20 performs this comparison once in each sampling time, which can be modified.

On the basis of the acceleration deviation signal $\alpha e$ supplied from the comparator circuit 20, the voltage command computing circuit 30 outputs predetermined command voltages Vua, Vva, and Vwa to the driving control circuit 40, which will be described later. The values of these command voltages are selected so that the level of the acceleration deviation signal $\alpha e$ is reduced to zero, and the command voltages are applied to the terminals of the motor 50 as terminal voltages.

In the first embodiment, as described previously, the motor 50 is of a three-phase, non-salient-pole, permanent-magnetic-field type. Therefore, the voltage command computing circuit 30 is constructed so as to calculate the command voltages from the following equation:

$$\begin{bmatrix} V_{ua} \\ V_{va} \\ V_{wa} \end{bmatrix} = -Ra\,I \begin{bmatrix} \sin\theta \\ \sin(\theta - 120°) \\ \sin(\theta - 240°) \end{bmatrix} \quad (1)$$

$$-L\left(\frac{d}{dt}I\right)\begin{bmatrix} \sin\theta \\ \sin(\theta - 120°) \\ \sin(\theta - 240°) \end{bmatrix}$$

$$-L\,I\left(\frac{d}{dt}\theta\right)\begin{bmatrix} \cos\theta \\ \cos(\theta - 120°) \\ \cos(\theta - 240°) \end{bmatrix}$$

$$-\phi_f\left(\frac{d}{dt}\theta\right)\begin{bmatrix} \sin\theta \\ \sin(\theta - 120°) \\ \sin(\theta - 240°) \end{bmatrix}$$

The symbols in the equation (1) and the basis on which equation (1) is derived will be explained below with reference to FIG. 3.

Figure 3:
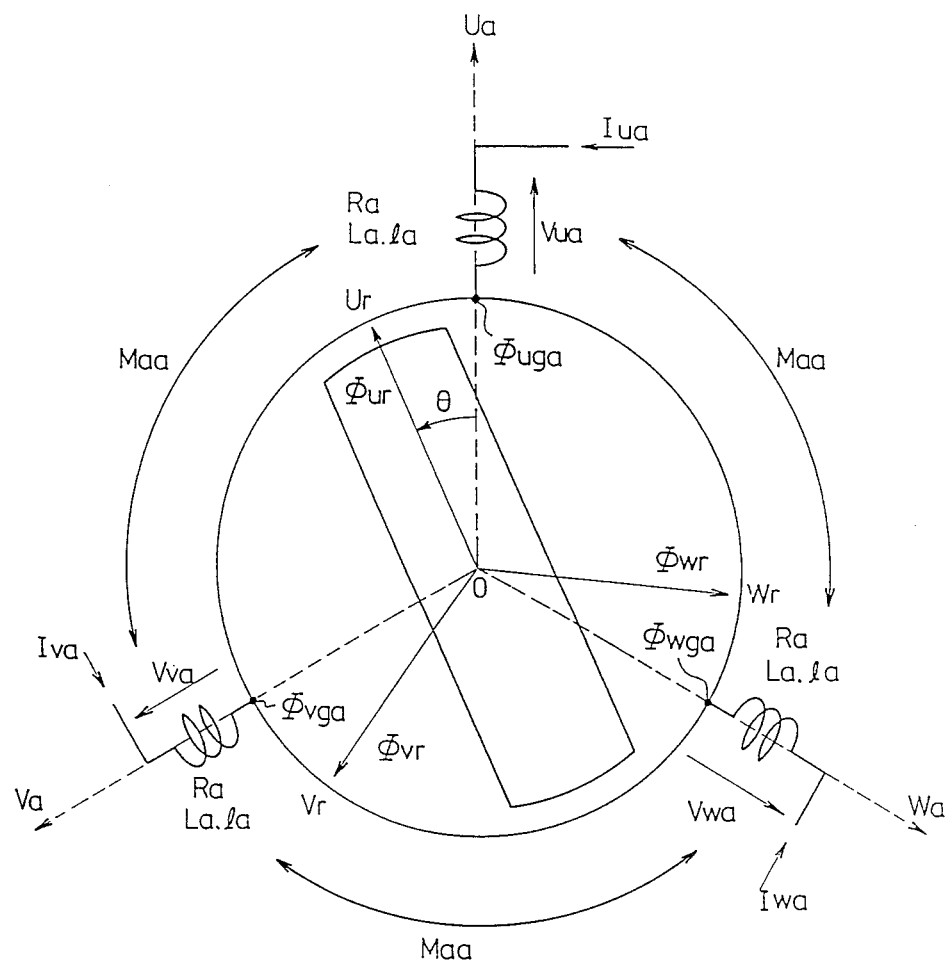
FIG. 3 is an illustration of a model of the motor used in the first embodiment.

FIG. 3 illustrates a model of the motor 50, and each element thereof is defined as follows:
- $\theta$: angle of rotation of the rotor,
- $Ra$: armature resistance,
- $La$: effective inductance of armature,
- $la$: leakage inductance of armature, and
- $Maa$: mutual inductance of armature windings where $L$ is defined as $L = La + la + Maa$. In addition,
- $Iua$: U-phase armature current,
- $Iva$: V-phase armature current,
- $Iwa$: W-phase armature current,
- $Vua$: U-phase armature voltage,
- $Vva$: V-phase armature voltage,
- $Vwa$: W-phase armature voltage,
- $\phi uga$: gap magnetic flux acting upon the U-phase armature,
- $\phi vga$: gap magnetic flux acting upon the V-phase armature,
- $\phi wga$: gap magnetic flux acting upon the W-phase armature,
- $\phi ur$: rotor magnetic flux in the U-axis direction of the rotor coordinates,
- $\phi vr$: rotor magnetic flux in the V-axis direction of the rotor coordinates,
- $\phi wr$: rotor magnetic flux in the W-axis direction of the rotor coordinates, and
- $I$: motor-current amplitude.

Thus, an equation which provides the voltage current magnetic flux of the three-phase, non-salient-pole, permanent-magnetic-flux type of synchronous motor is expressed as follows:

| | | | | | | | | |
|---|---|---|---|---|---|---|---|---|
| $V_{ua}$ | $Ra + s(La + la)$ | $-sMaa$ | $-sMaa$ | $s\cos\theta$ | $s\cos(\theta + 120°)$ | $s\cos(\theta + 240°)$ | $I_{ua}$ | (2) |
| $V_{va}$ | $-sMaa$ | $Ra + s(La + la)$ | $-sMaa$ | $s\cos(\theta-120°)$ | $s\cos\theta$ | $s\cos(\theta + 120°)$ | $I_{va}$ | |
| $V_{wa}$ | $-sMaa$ | $-sMaa$ | $Ra + s(La + la)$ | $s\cos(\theta-240°)$ | $s\cos(\theta-120°)$ | $s\cos\theta$ | $I_{wa}$ | |
| $\phi uga$ | $La$ | $-\tfrac{1}{2}La$ | $-\tfrac{1}{2}La$ | $\cos\theta$ | $\cos(\theta + 120°)$ | $\cos(\theta + 240°)$ | $\phi ur$ | |
| $\phi vga$ | $-\tfrac{1}{2}La$ | $La$ | $-\tfrac{1}{2}La$ | $\cos(\theta - 120°)$ | $\cos\theta$ | $\cos(\theta + 120°)$ | $\phi vr$ | |
| $\phi wga$ | $-\tfrac{1}{2}La$ | $-\tfrac{1}{2}La$ | $La$ | $\cos(\theta - 240°)$ | $\cos(\theta - 120°)$ | $\cos\theta$ | $\phi wr$ | | where $s$ denotes the differential coefficient $\left(\dfrac{d}{dt}\right)$.

If
$Iua = -I\sin\theta$,
$Iva = -I\sin(\theta - 120°)$,
$Iwa = -I\sin(\theta - 240°)$,
$\phi ur = \phi r$,
$\phi vr = 0$, and
$\phi wr = 0$,
the following equation is obtained:

| | | | | | | | | |
|---|---|---|---|---|---|---|---|---|
| $V_{ua}$ | $Ra+s(La+la)$ | $-sMaa$ | $-sMaa$ | $s\cos\theta$ | $s\cos(\theta+120°)$ | $s\cos(\theta+240°)$ | $-I\sin\theta$ | (3) |
| $V_{va}$ | $-sMaa$ | $Ra+s(La+la)$ | $-sMaa$ | $s\cos(\theta-120°)$ | $s\cos\theta$ | $s\cos(\theta+120°)$ | $-I\sin(\theta-120°)$ | |
| $V_{wa}$ = | $-sMaa$ | $-sMaa$ | $Ra+s(La+la)$ | $s\cos(\theta-240°)$ | $s\cos(\theta-120°)$ | $s\cos\theta$ | $-I\sin(\theta-240°)$ | |
| $\Phi uga$ | $La$ | $-\tfrac{1}{2}La$ | $-\tfrac{1}{2}La$ | $\cos\theta$ | $\cos(\theta+120°)$ | $\cos(\theta+240°)$ | $\Phi f$ | |
| $\Phi vga$ | $-\tfrac{1}{2}La$ | $La$ | $-\tfrac{1}{2}La$ | $\cos(\theta-120°)$ | $\cos\theta$ | $\cos(\theta+120°)$ | $0$ | |
| $\Phi wga$ | $-\tfrac{1}{2}La$ | $-\tfrac{1}{2}La$ | $La$ | $\cos(\theta-240°)$ | $\cos(\theta-120°)$ | $\cos\theta$ | $0$ | |

-continued
$$\begin{bmatrix} V_{ua} \\ V_{va} \\ V_{wa} \end{bmatrix} = \begin{bmatrix} -\{Ra+s(La+la)\}I\sin\theta+sMaa\ I\sin(\theta-120°)+sMaa\ I\sin(\theta-120°)+s\cos\theta\Phi_f \\ sMaa\ I\sin\theta-\{Ra+s(La+la)\}I\sin(\theta-120°)+sMaa\ I\sin(\theta-240°)+s\cos(\theta-120°)\Phi_f \\ sMaa\ I\sin\theta+sMaa\ I\sin(\theta-120°)-\{Ra+S(La+la)\}I\sin(\theta-240°)+s\cos(\theta-240°)\Phi_f \end{bmatrix}$$

The phase voltages Vua, Vva, and Vwa are as follows:

$$\begin{aligned}
V_{ua} &= -Ra\ I\sin\theta - (La + la)\\
&\quad \{(s\ I)\sin\theta + I\cos\theta(s\theta)\} + \\
&\quad sMaa\ I\ \{\sin(\theta - 120°) + \sin(\theta - 240°) - \phi_f\sin\theta(s\theta)\\
&= -Ra\ I\sin\theta - (La + la + Maa)\sin\theta(s\ I)\\
&\quad \{(La + la + Maa)\ I\cos\theta + \phi_f\sin\theta\}(s\theta)
\end{aligned}$$

$$\begin{aligned}
V_{va} &= Maas\ I\ \{\sin\theta + \sin(\theta - 240°)\} - \\
&\quad -Ra\ I\sin(\theta - 120°) - \\
&\quad (La + la)\ \{(s\ I)\sin(\theta - 120°) + \\
&\quad I\cos(\theta - 120°)(s\theta)\} - \sin(\theta - 120°)(s\theta)\ \phi_f \\
&= -Ra\ I\sin(\theta - 120°) - \\
&\quad (La + la + Maa)\sin(\theta - 120°)(s\ I)\\
&\quad \{(La + la + Maa)\ I\cos(\theta - 120°) + \\
&\quad \phi_f\sin(\theta - 120°)\}(s\theta)
\end{aligned}$$

$$\begin{aligned}
V_{wa} &= sMaa\ I\ \{\sin\theta + \sin(\theta - 120°)\} - \\
&\quad Ra\ I\sin(\theta - 240°) - (La + la)s\ I\sin(\theta - 240°) - \\
&\quad \phi_f\sin(\theta - 240°)\}(s\theta)\\
&= -Ra\ I\sin(\theta - 240°) - \\
&\quad (La + la + Maa)\sin(\theta - 240°)(s\ I) + \\
&\quad \{(La + la + Maa)I\cos(\theta - 240°) + \\
&\quad \phi_f\sin(\theta - 240°)\}(s\ \theta)
\end{aligned}$$

It will be understood, therefore, that the phase voltages Vua, Vva, and Vwa are expressed by the following equation:

$$\begin{bmatrix} V_{ua} \\ V_{va} \\ V_{wa} \end{bmatrix} = -Ra\ I \begin{bmatrix} \sin\theta \\ \sin(\theta - 120°) \\ \sin(\theta - 240°) \end{bmatrix} \tag{4}$$

$$-(La + la + Maa)(s\ I) \begin{bmatrix} \sin\theta \\ \sin(\theta - 120°) \\ \sin(\theta - 240°) \end{bmatrix}$$

$$- \left[ \left[ (La + la + Maa)I \begin{bmatrix} \cos\theta \\ \cos(\theta - 120°) \\ \cos(\theta - 240°) \end{bmatrix} \right.\right.$$

$$\left.\left. + \phi_f \begin{bmatrix} \sin\theta \\ \sin(\theta - 120°) \\ \sin(\theta - 240°) \end{bmatrix} \right] \right](s\theta)$$

Therefore, when equation (4) is further rewritten, equation (1) is obtained.

Referring back to equation (), the phase voltages (voltage command values) Vua, Vva, and Vwa are obtained by calculating each term on the right-hand side of equation (1), which is a determinantal equation constituted by three rows x one column. More specifically, the armature resistance R, the sum L of the armature effective inductance La, the armature leakage inductance la, and the armature winding mutual inductance Maa; and the rotor magnetic flux $\phi_1$ are primarily determined as motor constants. Each term containing sines and cosines can be obtained from a table of fixed trigonometric functions as well as the relative positional relationship between the stator of the motor 50 and the rotor thereof, that is, the angle of rotation $\theta$ of the rotor. In addition, $$\frac{d}{dt}\theta(s\theta),$$

linked to the third and fourth terms on the right-hand side, is obtained by once differentiating the angle of rotation $\theta$ which is a position feedback signal, since $$\frac{d}{dt}\theta(s\theta)$$

is equivalent to the speed feedback signal $\theta$. Similarly, the motor current I is proportional to the acceleration feedback signal $\theta$, the motor current I is obtained by differentiating the aforesaid position feedback signal $\theta$ twice or by differentiating the speed feedback signal $\theta$ once.

Accordingly, as shown in FIG. 2, the voltage command computing circuit 30 in this embodiment is constituted by an arithmetic operation unit 31 for outputting a motor current amplitude I by multiplying a constant $k_1$ by the acceleration feedback signal $\theta$ supplied from the signal generator 60; an arithmetic operating unit 32 for calculating a motor current variation $$\left(\frac{d}{dt}I\right)$$

relating to the second term on the right-hand side of the equation (1) by multiplying a constant $k_2$ by the acceleration deviation signal $\alpha e$ on the basis of the fact that the degree of variation of acceleration is to be commanded once in each sampling time by the acceleration deviation signal $\alpha e$ output from the comparator circuit 20 and that this degree of variation of acceleration is proportional to the variation $$\left(\frac{d}{dt}I\right)$$

of a motor current (where $k_2 = k_1 \cdot G \cdot L$ and G is the gain of an acceleration loop); an arithmetic operating unit 34 for calculating RaI in the first term on the right-hand side by multiplying the motor current I by the armature resistance Ra; an arithmetic operating unit 35 for calculating $$\phi_f \left( \frac{d}{dt} \theta \right)$$

in the fourth term on the right-hand side; an arithmetic operating unit 36 for calculating LI $$\left( \frac{d}{dt} \theta \right) = LI\theta$$

in the third term on the right-hand side; an arithmetic operating unit 37 constructed including a trigonometric function table for use in calculating each term on the right-hand side while calculating each trigonometric function term; and an arithmetic operating unit 38 for calculating the phase voltages Vua, Vva, and Vwa by adding each term on the right-hand side.

The driving control circuit 40 is constituted by a modulator 41 and PWM amplifier group 42 for converting the pattern of each phase voltage command value Vua, Vva, and Vwa output from the voltage command computing circuit 30 by means of PWM (pulse width modulation). Accordingly, even if the motor 50 has a rating of scores of kW, the driving control circuit 40 is applicable to such a motor, and it is thus possible to increase the freedom of selection of signal levels in the voltage command computing circuit 30.

Therefore, in the first embodiment, at each of optimum sampling times corresponding to the mechanical system, the acceleration command value αc supplied from the acceleration commanding unit 10 is directly compared with the actual acceleration θ, as an acceleration feedback signal supplied from the signal generator 60, and thus the phase voltage command values Vua, Vva, and Vwa are calculated by the voltage command computing circuit 30 whereby the motor 50 can be controlled and driven through the driving control circuit 40. Therefore, even if the level of a load applied to the motor 50 varies or the inertia of the load or the torque constant of the motor differs from an assumed value, no error is produced by these disturbances and thus the accurate control of acceleration can be achieved. Unlike the previously-described acceleration control system which employs the current minor loop including an analog circuit such as that shown in FIG. 8, acceleration can be controlled by digital processing. Therefore, there is no likelihood that an offset or a drift is involved and thus no torque ripple occurs. Accordingly, this embodiment is significantly effective in that no vibration is caused.

As described previously, acceleration can be controlled by digital processing at each of sampling times. Therefore, the acceleration control of the first embodiment can be carried out in accordance with a suitably selected sampling time. For example, in a case where the first embodiment is applied to the tool feed control of a machine tool, it is possible to obtain a significant operational advantage in that acceleration control well suited for the characteristics of the mechanical system of each individual machine tool can be accomplished. It is thus possible to effectively improve the production efficiency and machining accuracy of the machine tool.

Unlike the prior art apparatus, the first embodiment needs no high-speed A/D converter since the voltage command computing circuit 30 may be constituted by a microprocessor. This is significantly economical and enables a reduction in the size and weight of the circuit 30. Accordingly, handling of the circuit 30, such as attachment of the circuit to a machine tool, is easy.

In addition, the signal generator 60 includes the position detector 61 constituted by a pulse encoder. Therefore, the previously-described digital processing can be further facilitated, and the speed feedback signal θ and the acceleration feedback signal θ can be easily and accurately generated by the differentiating circuits 64 and 65.

Furthermore, since the driving control circuit 40 includes the modulator 41 for effecting PWM pattern conversion, the voltage command computing circuit 30 and the motor 50 are easily matched with each other and this significantly improves the adaptability with respect to an object to be controlled.

(SECOND EMBODIMENT)

Figure 4:
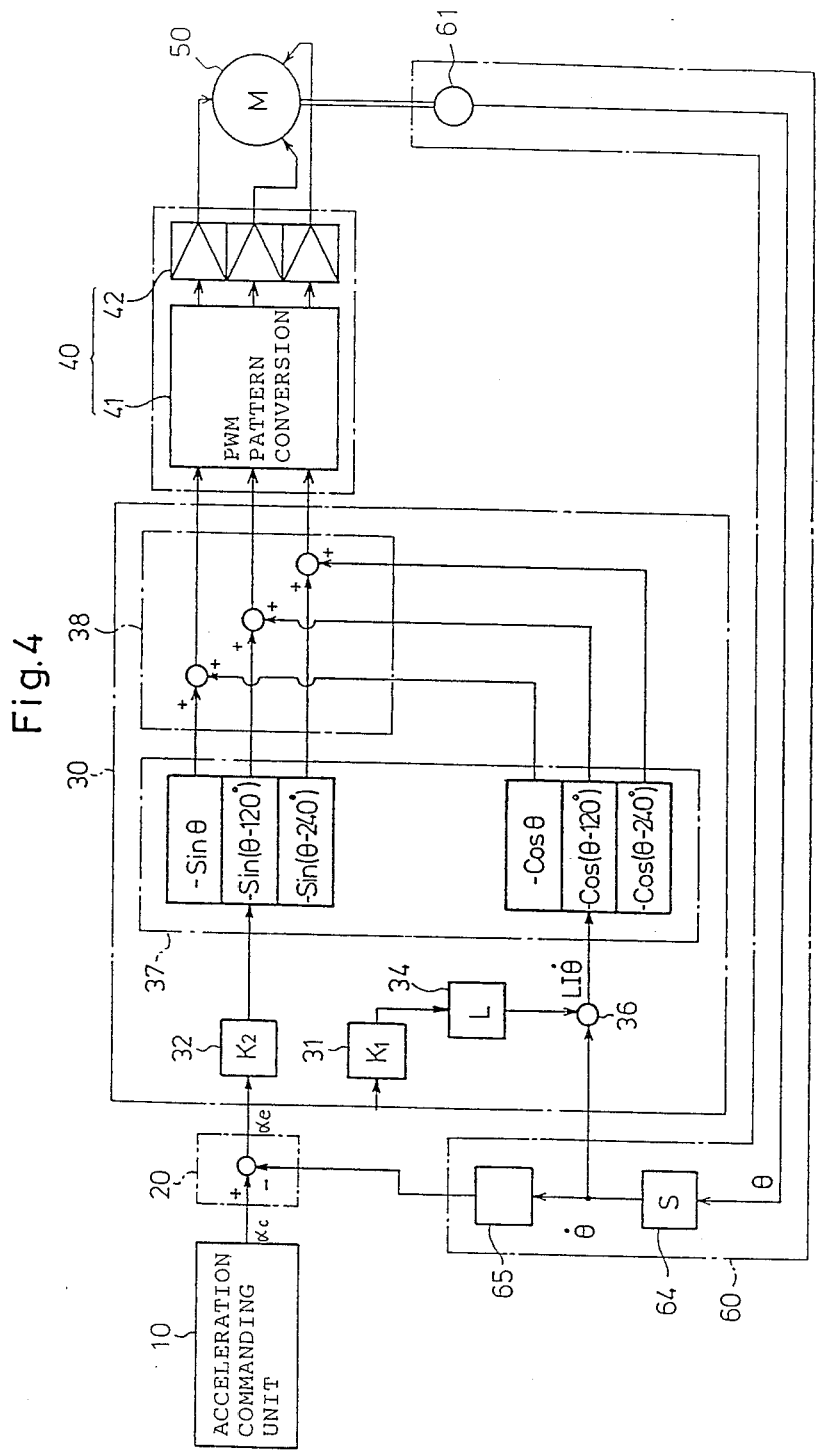
FIG. 4 is a block diagram illustrating the simplified form of a second preferred embodiment employing a three-phase a.c. motor.

As shown in FIG. 4, a second embodiment differs from the first embodiment in that the first and fourth terms on the right-hand side of equation (1) are omitted since the directions of the vectors of the first, second and fourth terms are the same as one another. Accordingly, the voltage command computing circuit 30 includes no arithmetic operation units equivalent to the arithmetic operation units 33 and 35 incorporated in the first embodiment. The acceleration commanding unit 10, the comparator circuit 20, the driving control circuit 40, the motor 50, and the signal generator 60 are the same as those used in the first embodiment.

Similar to the second embodiment, the first embodiment performs the feedback of acceleration signals and therefore it is possible to achieve similar effects and functions to those of the first embodiment, such as accurate acceleration control. In addition, the voltage commanding computing circuit 30 can be easily constructed since the first and fourth terms of equation (1) are omitted, whereby the second embodiment is smaller in size and more economical than the first embodiment.

(THIRD EMBODIMENT)

Figure 5:
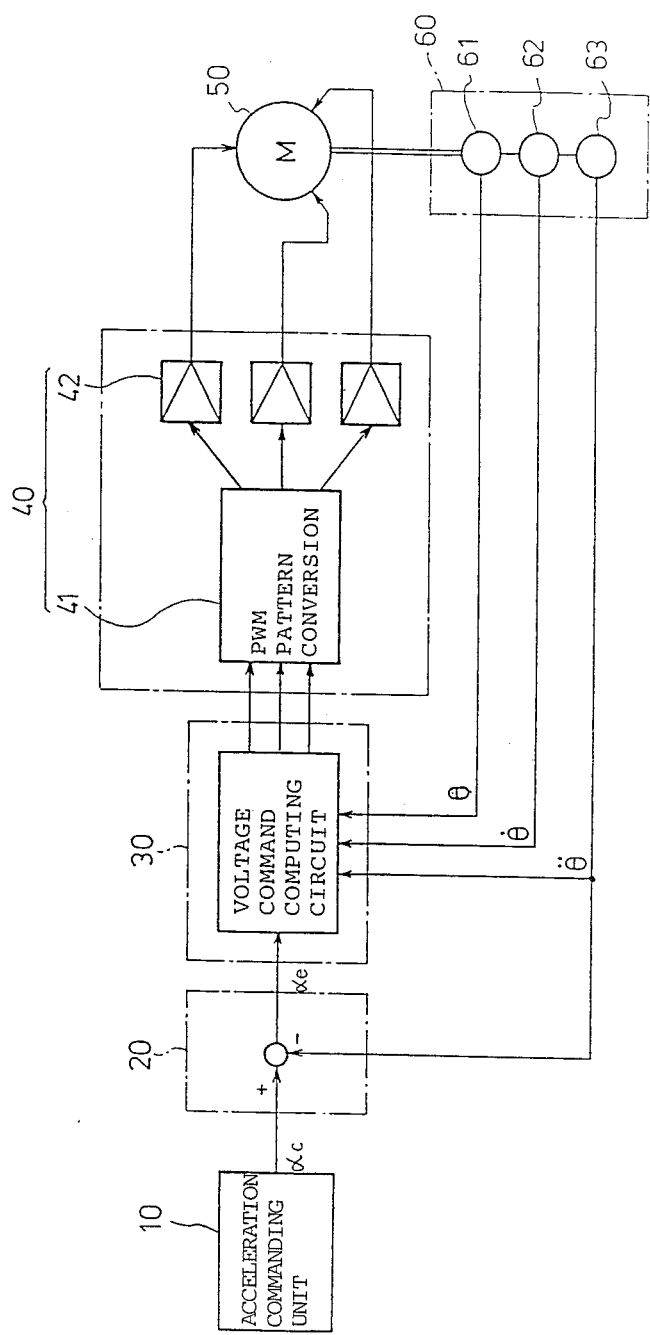
FIG. 5 is a block diagram illustrating a third preferred embodiment employing a different form of signal generator.

As shown in FIG. 5, the third embodiment differs from the first embodiment in that the signal generator 60 is not constituted by the position detector 61 and the differentiating circuits 64, 65. Instead, the signal generator 60 is constituted by a position detector 61 for generating a position feedback signal or angle of rotation θ of the rotor of the motor 50, a speed detector 62 for generating the speed feedback signal θ, and an acceleration detector 63 for generating and the acceleration feedback signal θ. The acceleration commanding unit 10, the comparator circuit 20, the driving control circuit 40, the motor 50, and the signal generator 60 are the same as those used in the first embodiment, and the detailed description thereof is therefore omitted.

Similar to the first embodiment, the third embodiment also performs the feedback of acceleration signals and thus it is possible to achieve similar effects and functions to those of the first embodiment, such as accurate acceleration control. It will be readily understood that the type and form of the signal generator 60 is not restrictive since the signal generator 60 is associated with the motor 50 and thus has only to generate the acceleration feedback signal $\theta$.

(FOURTH EMBODIMENT)

A fourth embodiment employs a d.c. motor and a signal generator constituted by a position detector.

Figure 6:
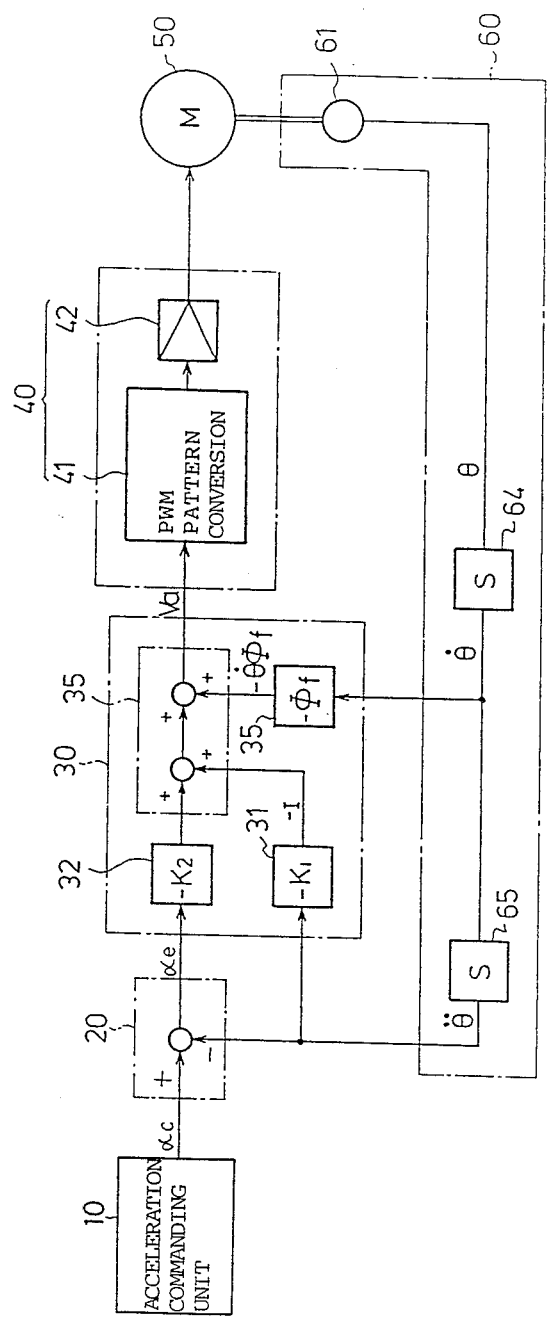
FIG. 6 is a detail block diagram of a fourth preferred embodiment employing a d.c. motor.

The acceleration control apparatus illustrated in FIG. 6 is constituted by the acceleration commanding unit 10, the comparator circuit 20, the voltage command computing circuit 30, the driving control circuit 40, the motor 50, and the signal generator 60.

Since the motor 50 is a d.c. motor, the voltage command computing circuit 30 can calculate the voltage command valve Va on the basis of:

$$V_a = -Ra\,I - L\left(\frac{d}{dt}I\right) - \phi\left(\frac{d}{dt}\theta\right) \quad (5)$$

where the armature resistance Ra and other elements are similar to those of the first embodiment.

In this case, each term on the right-hand side of equation (5) can be obtained in a similar manner to that of the first embodiment.

The comparator circuit 20, the signal generator 60 and so forth are the same as those of the first embodiment, and therefore the detailed description thereof will be omitted.

The fourth embodiment is designed to control the d.c. motor 50. However, accurate control of acceleration is positively ensured without being affected by disturbance such as variations in a load since the acceleration command value αc is directly compared with the actual acceleration $\theta$ in the comparator circuit 20.

Figure 7:
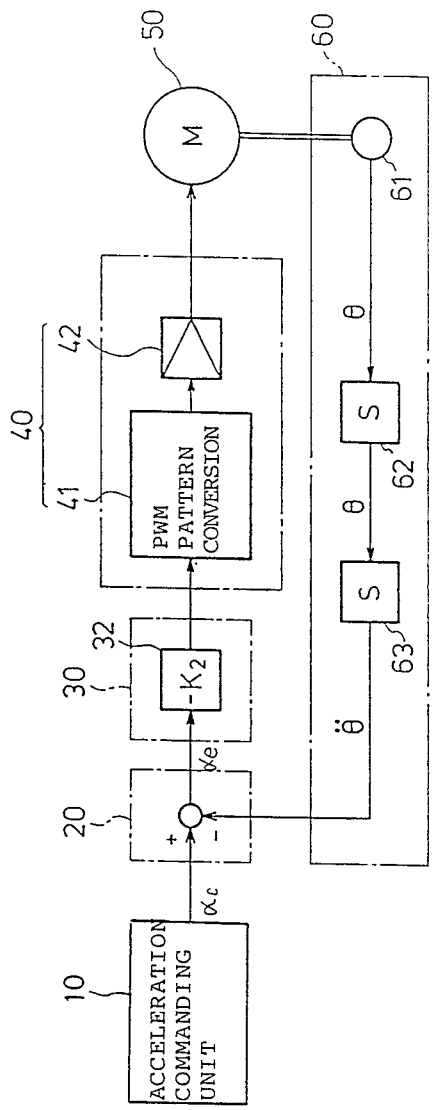
FIG. 7 is a block diagram similar to FIG. 6, illustrating a simplified form of the fourth embodiment.

The fourth embodiment as shown in FIG. 7 may be modified by noticing the fact that the directions of the vectors of the respective terms on the right-hand side of equation (5) are the same as one another.

The above-described embodiments are constructed by separate components such as the acceleration commanding unit 10, the comparator circuit 20, and the voltage command computing circuit 30. However, these components may be integrally formed by a computer since all that is required is to calculate the actual value of acceleration of the motor 50 to perform feedback control of the motor 50.

The type of the motor 50 may not be limited to the above-mentioned type. For example, the present invention may also be applied to a salient-pole type motor and an induction motor.

The present invention advantageously provides an acceleration control apparatus which can achieve accurate acceleration control without being affected by any disturbance such as load variations or non-uniformity of motor torque characteristics and without generating an overshoot or vibration.

What is claimed is:

1. An acceleration control apparatus comprising:
   an acceleration commanding unit;
   a signal generator connected to a motor for generating a signal indicative of an actual value of acceleration of said motor;
   a comparator circuit for generating an acceleration deviation signal by comparing an acceleration command value supplied from said acceleration commanding unit and said actual value of acceleration supplied from said signal generator;
   a voltage command computing circuit for calculating a voltage command value on the basis of an acceleration deviation signal output from said comparator circuit; and
   a driving control circuit for generating electrical signals suitable for driving and controlling said motor on the basis of said voltage command value of said voltage command computing circuit,
   whereby acceleration is controlled on the basis of the comparison of said acceleration command value and said actual value of acceleration.

2. An acceleration control apparatus according to claim 1, wherein said signal generator includes a position detector and a differentiating circuit both of which are directly connected to said motor.

3. An acceleration control apparatus according to claim 2, wherein said position detector is constituted by a pulse encoder.

4. An acceleration control apparatus according to claim 2, wherein said signal generator is arranged to output a speed feedback signal and a position feedback signal to said voltage command computing circuit.

5. An acceleration control apparatus according to claim 1, wherein said signal generator is constituted by an acceleration detector connected directly to said motor.

6. An acceleration control apparatus according to claim 1, wherein said driving control circuit is constructed including PWM pattern conversion means.

7. An acceleration control apparatus according to claim 1, wherein said motor is a three-phase, permanent-magnetic-field type of motor.

8. An acceleration control apparatus according to claim 1, wherein said motor is a d.c. motor.

* * * * *